US006502764B2

(12) United States Patent
Walker

(10) Patent No.: US 6,502,764 B2
(45) Date of Patent: Jan. 7, 2003

(54) POP-UP SPRINKLER WITH INTERNAL DEBRIS CUP

(76) Inventor: Samuel C. Walker, 1652 Redwood Way, Upland, CA (US) 91784

( * ) Notice: Subject to any disclaimer, the term of this patent is extended or adjusted under 35 U.S.C. 154(b) by 0 days.

(21) Appl. No.: 09/727,438

(22) Filed: Nov. 30, 2000

(65) Prior Publication Data

US 2002/0063166 A1 May 30, 2002

(51) Int. Cl.[7] .......................... B05B 15/10; B05B 15/06; A01G 25/06

(52) U.S. Cl. ........................ 239/203; 239/201; 239/204; 239/205; 239/206

(58) Field of Search ................................ 239/203, 204, 239/205, 206, 240, 201, 242

(56) References Cited

U.S. PATENT DOCUMENTS 4,616,780 A * 10/1986 Abbott ....................... 239/113
5,871,156 A * 2/1999 Lawson ...................... 239/201
5,875,969 A * 3/1999 Grundy ...................... 239/113
6,199,584 B1 * 3/2001 Brown et al. ............ 137/519.5

* cited by examiner

*Primary Examiner*—Michael Mar
*Assistant Examiner*—Davis Hwu
(74) *Attorney, Agent, or Firm*—John D. Bauersfeld; Kelly Bauersfeld Lowry & Kelley, LLP

(57) ABSTRACT

A pop-up sprinkler is provided with an internally mounted and upwardly open debris cup for capturing debris such as dirt and pebbles falling into the sprinkler, to prevent such debris from contacting and interfering with an internally mounted rotary drive mechanism. The sprinkler includes a housing or case carrying a pop-up riser with a spray head thereon for projecting a stream of irrigation water over surrounding terrain and vegetation. The rotary drive mechanism includes a water-driven element such as a turbine coupled by a reduction gear unit or the like for rotatably driving the spray head in a manner sweeping the projected water stream over the surrounding terrain and vegetation. The debris cup is mounted within the sprinkler case generally at a lower end of a nozzle passage formed in the riser, and generally overlying the water-driven element, in a position to capture and retain debris falling into the sprinkler case through the nozzle passage.

8 Claims, 3 Drawing Sheets

POP-UP SPRINKLER WITH INTERNAL DEBRIS CUP

BACKGROUND OF THE INVENTION

This invention relates generally to irrigation sprinklers of the type having a rotary driven spray head mounted at the upper end of a pop-up riser. More particularly, this invention relates to an improved irrigation sprinkler including an internally mounted debris cup for capturing and retaining debris such as dirt and small pebbles ingested into the sprinkler through the riser, to prevent such ingested debris from contacting and interfering with a rotary drive mechanism.

Pop-up irrigation sprinklers are well known in the art particularly for use in irrigation systems wherein it is necessary or desirable to embed the sprinkler in the ground so that it does not project appreciably above ground level when not is use. In a typical pop-up sprinkler, a tubular riser is mounted within a generally cylindrical upright sprinkler housing or case having an open upper end, with a spray head carrying one or more spray nozzles carried at an upper end of the riser. In a normal inoperative position, the spray head and riser are spring-retracted substantially into the sprinkler case so that they do not extend or project a significant distance above the case or the surrounding ground level. However, when water under pressure is supplied to the sprinkler case, the riser is displaced upwardly to shift the spray head to an elevated spraying position spaced above the sprinkler case. The water under pressure flows through a vertically oriented nozzle passage in the riser to the spray head which includes an appropriately shaped nozzle for projecting a stream of irrigation water generally radially outwardly over a surrounding terrain area and associated vegetation.

In many pop-up sprinkler designs, a rotary drive mechanism is provided within the sprinkler case for rotatably driving the spray head through continuous full circle revolutions, or alternately back and forth within a predetermined part-circle arcuate path, to sweep the projected water stream over a selected target terrain area. In addition, the spray head for the rotary drive pop-up sprinkler is frequently adapted for removable mounting of a selected one of a set of spray nozzle inserts designed to custom-tailor the specific characteristics of the projected water stream, such as flow rate, trajectory range, stream width, and the like, in accordance with the particular irrigation requirements for each pop-up sprinkler. For examples of rotary drive pop-up sprinklers of this general type, see U.S. Pat. Nos. 4,625,914; 4,787,558; and 5,383,600. In addition, such sprinklers are commercially available from Rain Bird Sprinkler Mfg. Corp. of Glendora, Calif. under the product designations T-Bird Series, 3500 Series, R-50, Falcon, and Talon.

It has been recognized that rotary drive sprinklers are susceptible to potential failure upon entry of debris such as dirt and grit or small pebbles into the sprinkler case interior, wherein such ingested debris can contact and jam moving parts of the rotary drive mechanism. To address this problem, such sprinklers have been equipped with inlet filters or filter screens to capture water-borne debris carried by the incoming water supply. In addition, wiper-type seals have been provided to reduce or eliminate debris ingestion along the exterior of the riser as it is displaced between the retracted and elevated spraying positions. However, the spray nozzle and the associated nozzle passage formed in the riser provides an additional pathway for potential debris ingestion into the sprinkler case, particularly when the sprinkler is initially installed in the ground before installing a selected spray nozzle insert onto the spray head. Although such sprinklers are often provided with a plug intended to prevent loose dirt and debris from falling through the nozzle passage into the case interior, occasional ingestion of dirt and small pebbles prior to or during installation of the spray nozzle insert still occurs. If such debris comes into contact with and jams the rotary drive mechanism, such as a water-driven turbine, it is typically necessary to remove the sprinkler from the ground for substantial disassembly and cleaning, or replacement.

There exists, therefore, a need for further improvements in and to the design of rotary drive pop-up sprinklers, particularly with respect to preventing failure of a rotary drive mechanism attributable to ingestion of debris such as dirt and small pebbles entering the sprinkler case through the pop-up riser. The present invention fulfills these needs and provides further related advantages.

SUMMARY OF THE INVENTION

In accordance with the invention, an improved pop-up and rotary drive irrigation sprinkler is provided with an internally mounted and upwardly open debris cup for capturing and retaining debris such as dirt and pebbles falling into the sprinkler through a tubular pop-up riser, to prevent such debris from contacting and interfering with an internally mounted rotary drive mechanism.

The sprinkler generally comprises a hollow sprinkler housing or case carrying a pop-up riser with a spray head mounted thereon for projecting a stream of irrigation water to surrounding terrain and vegetation. In a normal inoperative position, the pop-up riser and spray head are retracted substantially into the sprinkler case. During operation, supply of water under pressure to the sprinkler case displaces the riser and spray head thereon to an elevated spraying position, with the spray head spaced above the sprinkler case for facilitated delivery of the water stream to the surrounding terrain. The water under pressure flows through a nozzle passage formed in the riser to the spray head having a nozzle through which the water stream is projected generally radially outwardly. The rotary drive mechanism includes a water-driven element such as a turbine coupled by a reduction gear unit or the like to the spray head for rotatably driving the spray head in a manner sweeping the projected water stream over a selected full-circle or part-circle arcuate pattern.

The debris cup is mounted within the sprinkler case generally at a lower end of the nozzle passage formed in the riser, and in a position generally overlying the water-driven element, to capture and retain debris falling into the sprinkler case through the riser. Accordingly, debris such as dirt and small pebbles which may be ingested into the sprinkler case through the riser, is prevented from contacting and interfering with the water-driven element.

Other features and advantages of the invention will become more apparent from the following detailed description, taken in conjunction with the accompanying drawings which illustrate, byway of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
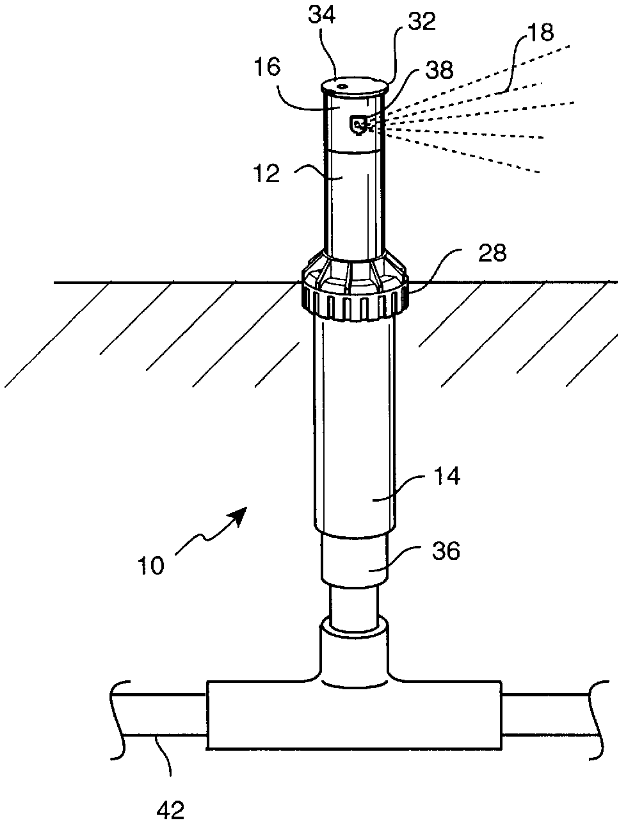
FIG. 1 is a fragmented perspective view illustrating a rotary drive pop-up irrigation sprinkler embodying the novel features of the invention.
Figure 4:
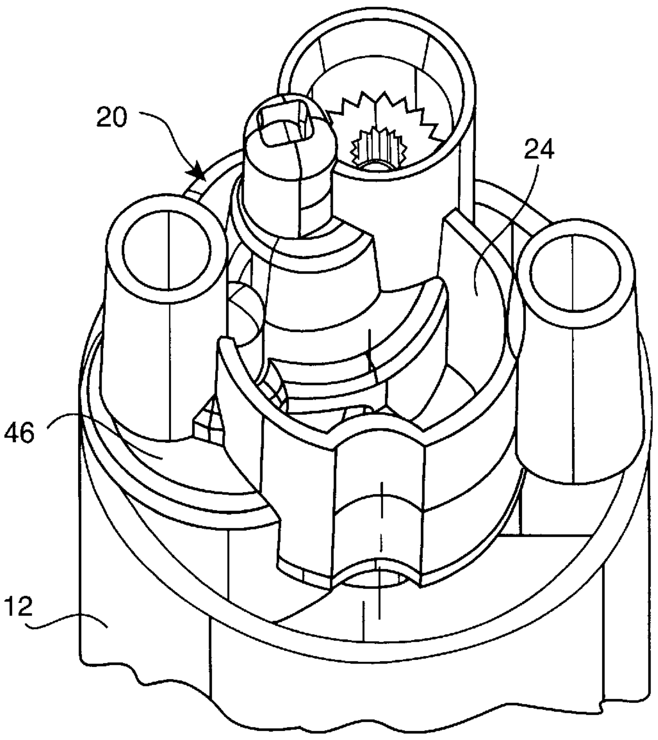
FIG. 4 is an enlarged and fragmented perspective view of a portion of the sprinkler, to illustrate an upwardly open debris cup mounted within the sprinkler case.

As shown in the exemplary drawings, an improved pop-up and rotary drive irrigation sprinkler is referred to generally in FIG. 1 by the reference numeral 10. The sprinkler 10 includes a tubular pop-up riser 12 mounted within a sprinkler housing or case 14 and carrying a spray head 16 at an upper end thereof for projecting a stream 18 (FIG. 1) of irrigation water outwardly over a selected surrounding terrain area and associated vegetation. A rotary drive mechanism 20 (FIGS. 2–3) is mounted within the sprinkler riser 12 and includes a water-driven element such as a turbine 22 or the like for rotatably driving the spray head 16 in a manner to sweep the projected water stream 18 over a full-circle or back-and-forth within a selected part-circle pattern. In accordance with the invention, an upwardly open debris cup 24 (FIGS. 2–4) is mounted within the sprinkler case 14 in a position to capture and retain any debris such as dirt or small pebbles ingested into the riser 12 through the nozzle insert 38 and/or nozzle cavity 39, to prevent such ingested debris from contacting and interfering with the rotary drive mechanism 20.

Figure 2:
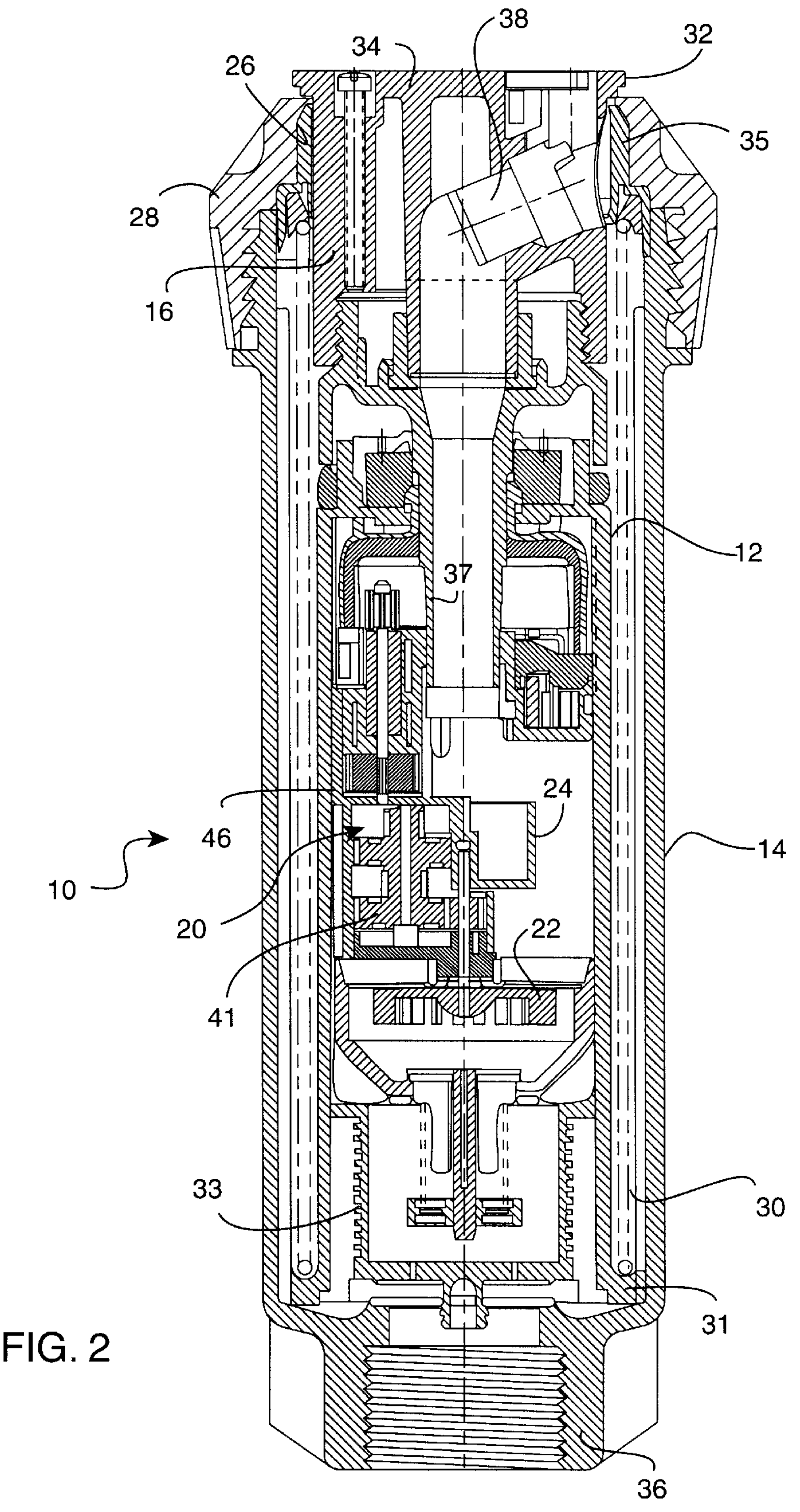
FIG. 2 is an enlarged vertical sectional view of the sprinkler shown in FIG. 1, depicting the sprinkler in a normal inoperative position with a pop-up riser and spray head retracted substantially into a sprinkler case.
Figure 3:
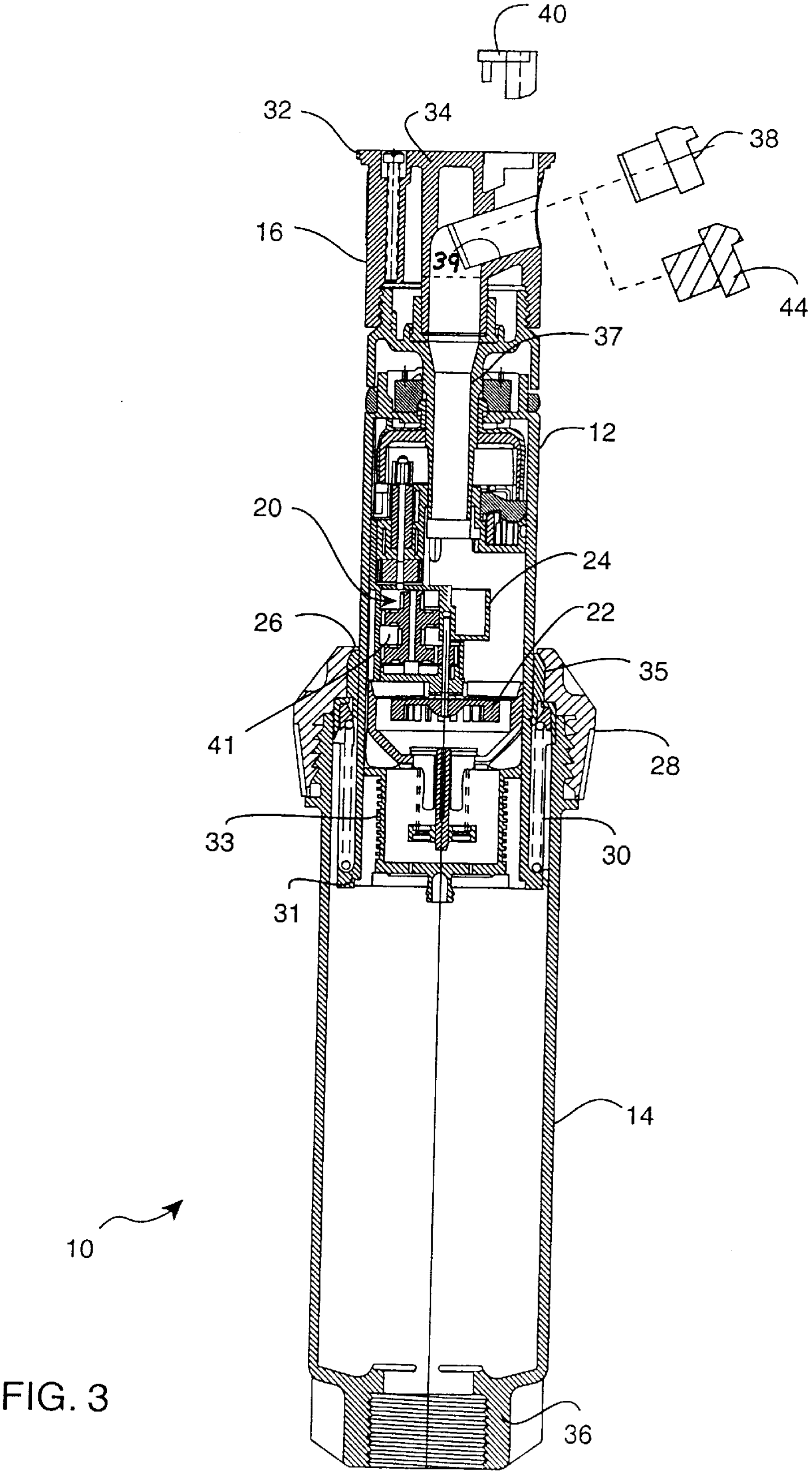
FIG. 3 is a partially exploded vertical sectional view of the sprinkler, depicting the pop-up riser and spray head in an elevated spraying position.

The illustrative pop-up and rotary drive style sprinkler 10 has a generally conventional overall construction and operation to sweep the outwardly projected water stream 18 over a selected target terrain area. More particularly, the sprinkler case 14 has a generally upright cylindrical configuration with the tubular riser 12 mounted slidably therein for movement between a normal inoperative position (FIG. 2) retracted into and substantially concealed within the case 14, and an elevated spraying position (FIGS. 1 and 3) with the spray head 16 at the riser upper end disposed in spaced relation above the sprinkler case 14. The riser 12 and spray head 16 thereon are slidably movable through a central opening 26 (FIGS. 2–3) formed in a annular cap 28 mounted onto an upper end of the sprinkler case 14. A retraction spring 30 is normally provided and reacts between the underside of the cap 28 and a flange 31 at the riser lower end for urging the riser 12 and spray head 16 downwardly to the normal retracted position, with a small radially outwardly projecting flange 32 on a top wall 34 of the spray head 16 resting firmly against the case cap 28, as shown in FIG. 2. When water under pressure is supplied to the sprinkler case 14 through an inflow port defined by an inlet fitting 36 located typically at the case bottom, the riser 12 is shifted upwardly by the water under pressure to the elevated spraying position. An inlet screen or filter 33 is normally provided at the inlet of the riser 12 to block entry of sizable particulate debris, and a wiper seal 35 normally lines the opening 26 in the cap 28 to prevent debris ingestion along the exterior of the riser 12.

In the elevated spraying position, the water under pressure flows upwardly into the hollow tubular riser 12 and through turbine 22 and a generally vertically oriented nozzle passage 37 (FIG. 2–3) to the spray head 16 having at least one contoured nozzle member 38 through which the water is projected laterally or generally radially outwardly in the form of the stream or spray 18 to irrigate the surrounding terrain and associated vegetation. The specific spray characteristics of the projected water stream 18, such as flow rate, trajectory and range, stream width and the like, are controlled by the specific geometry of the nozzle member 38. In this regard, the nozzle member 38 shown in the illustrative drawings conveniently comprises an interchangeable nozzle insert 38 which may be selected from a group of nozzle inserts adapted respectively to provide projected water streams of different selected spray characteristics. The nozzle insert 38 may be adapted for suitable snap-fit installation into a nozzle cavity 39 formed in the spray head, and a retainer element 40 may be employed for snap-fit or other suitable mounting onto the spray head cap 16 for securely yet removably locking the nozzle insert 38 in place.

The rotary drive mechanism 20 for the pop-up sprinkler 10 is mounted within the sprinkler case 14 and responds to the inflow of water under pressure to rotate the spray head 16 in a manner sweeping the stream 18 through continuous full circle revolutions or alternately back-and-forth within the boundaries of a predetermined arcuate path. More particularly, as shown in the exemplary embodiment, the water inflow rotatably drives the turbine 22 which is mechanically linked to the spray head 16 by a reduction gear drive unit 41 or the like for rotatably driving the spray head 16 in the elevated spraying position. Suitable reverse means (not shown) may be provided for reversing the direction of spray head rotation at adjustably preset points so that the spray head 16 rotates head back-and-forth within the predetermined limits of a part-circle arcuate path, if desired. For examples of rotary drive pop-up sprinklers of this general type, see U.S. Pat Nos. 4,625,914; 4,787,558; and 5,383,600. In addition, such sprinklers are commercially available from Rain Bird Sprinkler Mfg. Corp. of Glendora, Calif. under the product designations T-Bird Series, 3500 Series, R-50, Falcon, and Talon.

The irrigation sprinkler 10 is often installed within an irrigation system including multiple sprinklers connected to a common water supply line 42 (FIG. 1), with each sprinkler 10 being partially buried with the top of the sprinkler positioned substantially at ground level. At the time of such initial installation, in one common form, each sprinkler 10 does not have a pre-installed nozzle insert 38, whereby the sprinkler is susceptible to ingestion of particulate such as soil and other debris through the open nozzle passage 37. In another form, the sprinkler 10 may be equipped with a nozzle plug 44 (FIG. 3) mounted on the spray head 16 in lieu of a selected nozzle insert 38 with the intention of preventing dirt and other debris from falling through the nozzle passage 37 into the interior of the sprinkler riser 12. When the multi-sprinkler irrigation system installation is ready for use, the nozzle plug 44 on each sprinkler is removed and replaced by the selected nozzle insert 38 having a spray pattern configuration chosen according to the irrigation requirements of each specific sprinkler in the system. In either case, however, after the sprinkler 10 is installed in the ground, access to the spray head 16 for removal of the optional nozzle plug 44 and installation of the selected nozzle insert 38 exposes the sprinkler to undesired particulate ingestion via the nozzle passage 37.

The debris cup 24 is provided within the sprinkler case 14 for capturing and retaining any small pebbles and other loose debris that falls or is otherwise ingested into the sprinkler through the nozzle passage 37 formed in the riser 12, particularly such as debris falling onto the turbine 22 during installation of a selected nozzle insert 38. The debris cup 24 comprises an upwardly open receptacle structure which may be formed as part of a housing 46 for the gear drive unit 41 (as shown best in FIG. 4), wherein the cup 24 is positioned within the sprinkler riser 12 generally in underlying vertical alignment with a lower end riser nozzle passage 37 (as shown best in FIGS. 2–3). In the preferred form as shown, the debris cup 24 is additionally positioned generally over the water driven turbine 22 (also shown best in FIGS. 2–3), in a location generally between the turbine 22 and the lower end of the nozzle passage 37. Since the sprinkler 10 is normally mounted in a substantially fixed and generally vertically upright orientation, the debris cup 24 collects and safely retains any ingested particulate debris to prevent such debris from falling into contact with the turbine where it could otherwise obstruct or jam turbine rotation and thereby result in failure of the rotary drive mechanism 20. Moreover, since the quantity of ingested debris is typically small over a normal sprinkler service life, there is no requirement for periodic maintenance to remove collected debris from the cup 24.

The improved rotary drive pop-up sprinkler 10 of the present invention, including the upwardly open debris cup 24, is thus safeguarded against potential failure attributable to ingestion of debris such as small dirt and the like falling onto the turbine 22 through the nozzle passage 37.

A variety of further modifications and improvements to the rotary drive pop-up sprinkler of the present invention will be apparent to those persons skilled in the art. For example, it will be recognized and understood that the debris cup 24 may be utilized with a variety of different pop-up sprinklers having different types of rotary drive mechanisms designed for rotatably driving the spray head, or for rotatably driving the riser tube upon which the spray head is mounted. Accordingly, no limitation on the invention is intended by way of the foregoing description and accompanying drawings, except as set forth in the appended claims.

What is claimed is:

1. In an irrigation sprinkler having a pop-up riser with a spray head thereon mounted within a sprinkler case for movement between an inoperative position retracted substantially into the sprinkler case and an elevated spraying position with the spray head spaced above the sprinkler case, and a rotary drive mechanism mounted within the sprinkler case for rotatably driving the spray head, the improvement comprising:

an upwardly open debris cup mounted within the sprinkler case in a position generally underlying a nozzle passage formed in the riser to capture and retain debris entering the sprinkler case through said nozzle passage formed in the riser.

2. The improvement of claim 1 wherein the rotary drive mechanism includes a water-driven element, and further wherein said debris cup is mounted in a position generally overlying said water-driven element.

3. The improvement of claim 3 wherein said water-driven element comprises a turbine.

4. In an irrigation sprinkler having a pop-up riser with a spray head thereon mounted within a sprinkler case for movement between an inoperative position retracted substantially into the sprinkler case and an elevated spraying position with the spray head spaced above the sprinkler case, and a rotary drive mechanism mounted within the sprinkler case for rotatably driving the spray head, the improvement comprising:

an upwardly open debris cup mounted within the sprinkler case in a position generally underlying a nozzle passage formed in the riser to capture and retain debris entering the sprinkler case through the riser;

wherein said debris cup is mounted in a position generally overlying at least a portion of the rotary drive mechanism.

5. An irrigation sprinkler, comprising:

a generally upright sprinkler case including an inlet fitting for connection to a supply of water under pressure;

a generally tubular pop-up riser defining a nozzle passage;

a spray head carried by said riser and including a nozzle member in flow communication with said nozzle passage, said riser being mounted within said sprinkler case for movement between an inoperative position retracted substantially into said sprinkler case and an elevated spraying position with said spray head spaced above said sprinkler case;

a rotary drive mechanism mounted within said sprinkler case for rotatably driving said spray head; and an upwardly open debris cup mounted within said sprinkler case in a position generally underlying said nozzle passage to capture and retain debris entering said sprinkler case through the nozzle passage of said riser.

6. The irrigation sprinkler of claim 5 wherein said rotary drive mechanism includes a water-driven element, and further wherein said debris cup is mounted in a position generally overlying said water-driven element.

7. The irrigation sprinkler of claim 6 wherein said water-driven element comprises a turbine.

8. An irrigation sprinkler, comprising:

a generally upright sprinkler case including an inlet fitting for connection to a supply of water under pressure;

a generally tubular pop-up riser defining a nozzle passage;

a spray head carried by said riser and including a nozzle member in flow communication with said nozzle passage, said riser being mounted within said sprinkler case for movement between an inoperative position retracted substantially into said sprinkler case and an elevated spraying position with said spray head spaced above said sprinkler case;

a rotary drive mechanism mounted within said sprinkler case for rotatably driving said spray head; and an upwardly open debris cup mounted within said sprinkler case in a position generally underlying said nozzle passage to capture and retain debris entering said sprinkler case through said riser;

wherein said debris cup is mounted in a position generally overlying at least a portion of said rotary drive mechanism.

* * * * *